(12) United States Patent
Sitaraman et al.

(10) Patent No.: US 11,579,019 B2
(45) Date of Patent: Feb. 14, 2023

(54) WIRELESS ENERGY-HARVESTING SENSOR PROBE

(71) Applicant: TE Connectivity Services GmbH, Schaffhausen (CH)

(72) Inventors: Srikrishna Sitaraman, Fremont, CA (US); Michael Paul Pacheco, San Francisco, CA (US); Cristian S. Regus, Union City, CA (US)

(73) Assignee: TE Connectivity Solutions GmbH, Schaffhausen (CH)

( * ) Notice: Subject to any disclaimer, the term of this patent is extended or adjusted under 35 U.S.C. 154(b) by 266 days.

(21) Appl. No.: 16/943,411

(22) Filed: Jul. 30, 2020

(65) Prior Publication Data

US 2021/0048347 A1 Feb. 18, 2021

Related U.S. Application Data

(60) Provisional application No. 62/887,012, filed on Aug. 15, 2019.

(51) Int. Cl.
*G01K 1/024* (2021.01)
*G01K 13/00* (2021.01)

(52) U.S. Cl.
CPC ............. *G01K 1/024* (2013.01); *G01K 13/00* (2013.01); *G01K 2207/06* (2013.01); *G01K 2215/00* (2013.01)

(58) Field of Classification Search
USPC ........................................................ 374/208
See application file for complete search history.

(56) References Cited

U.S. PATENT DOCUMENTS

| | | | |
|---|---|---|---|
| 2009/0188396 A1 | 7/2009 | Hofmann et al. | |
| 2019/0041271 A1 | 2/2019 | Preston et al. | |
| 2019/0285483 A1* | 9/2019 | Cheng | G01K 1/024 |
| 2019/0339133 A1* | 11/2019 | Pulvermacher | G01K 1/14 |
| 2020/0182703 A1* | 6/2020 | Bourret | G01K 7/36 |

FOREIGN PATENT DOCUMENTS

| | | | | |
|---|---|---|---|---|
| DE | 102004047758 A1 | | 4/2006 | |
| KR | 2020006123 A | * | 1/2020 | ............ G01K 1/024 |

OTHER PUBLICATIONS

EP Search Report, dated Jan. 13, 2021, 8 pgs.

* cited by examiner

*Primary Examiner* — Mirellys Jagan

(57) ABSTRACT

A battery-free sensor probe and system for measuring the temperature of food The sensor probe includes a probe portion and a handle. The probe portion has a temperature sensor, a circuit board and a radio frequency identification device. The handle has an antenna connected to radio frequency identification device and the circuit board. The sensor probe harvests energy from a radio frequency transmitter positioned near the sensor probe.

13 Claims, 4 Drawing Sheets

WIRELESS ENERGY-HARVESTING SENSOR PROBE

FIELD OF THE INVENTION

The present invention is directed to a wireless sensor probe for monitoring temperature. In particular, the invention is directed to a wireless energy-harvesting sensor probe for monitoring temperature in food.

BACKGROUND OF THE INVENTION

Proper handling and cooking of food, especially meats, is essential to avoiding contamination by disease-causing bacteria or pathogens. The United States Centers for Disease Control and prevention (CDC) estimates that every year 48 million people get sick from a foodborne illness, 128,000 are hospitalized, and 3,000 die. The US Food and Drug Administration (USFDA) recommends using a thermometer to ensure that a minimum temperature of 140° F. to 165° F. is attained inside the meat during cooking. Smart ovens communicate with temperature probes to enable energy-efficient regulation of temperature and prevent any risk of fire due to unattended over-heating of food.

A wireless, battery-free meat probe eliminates the hassles of dealing with long wires and having to charge batteries, thereby improving usability and longevity of the product. However, few meat probes in the market satisfy all the criteria: wireless, battery-free, and able to communicate with the oven. Key challenges for wireless solutions are the large chip size for Bluetooth, which results in a large diameter of the spit (needle), and the need for a battery. Analog probes based on Surface Acoustic Wave (SAW) devices are either orientation-dependent or are expensive for even a single accurate temperature monitoring location. Customers prefer the ability to monitor temperature at different depths inside a piece of meat being cooked, or to have multiple probes inside.

It would be, therefore, be beneficial to provide a sensor probe which is wireless and which does not need batteries, thereby allowing the needle of the sensor probe to have a small diameter. In would also be beneficial to provide a sensor probe which could monitor the temperature of food at different depths.

SUMMARY OF THE INVENTION

An object is to provide a wireless energy-harvesting sensor probe or meat probe which can operate in a high temperature of operation inside an oven.

An embodiment is directed to a battery-free sensor probe for measuring the temperature of food. The sensor probe includes a probe portion and a handle. The probe portion has a temperature sensor, a circuit board and a radio frequency identification device. The handle has an antenna connected to radio frequency identification device and the circuit board. The sensor probe harvests energy from a radio frequency transmitter positioned near the sensor probe.

An embodiment is directed to a system for measuring the temperature of food in an oven. The system includes a battery-free sensor probe configured to be inserted into the food and a radio frequency transmitter positioned in the oven. The radio frequency transmitter sends a signal to the battery-free sensor probe to communicate with and power the battery-free sensor probe.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
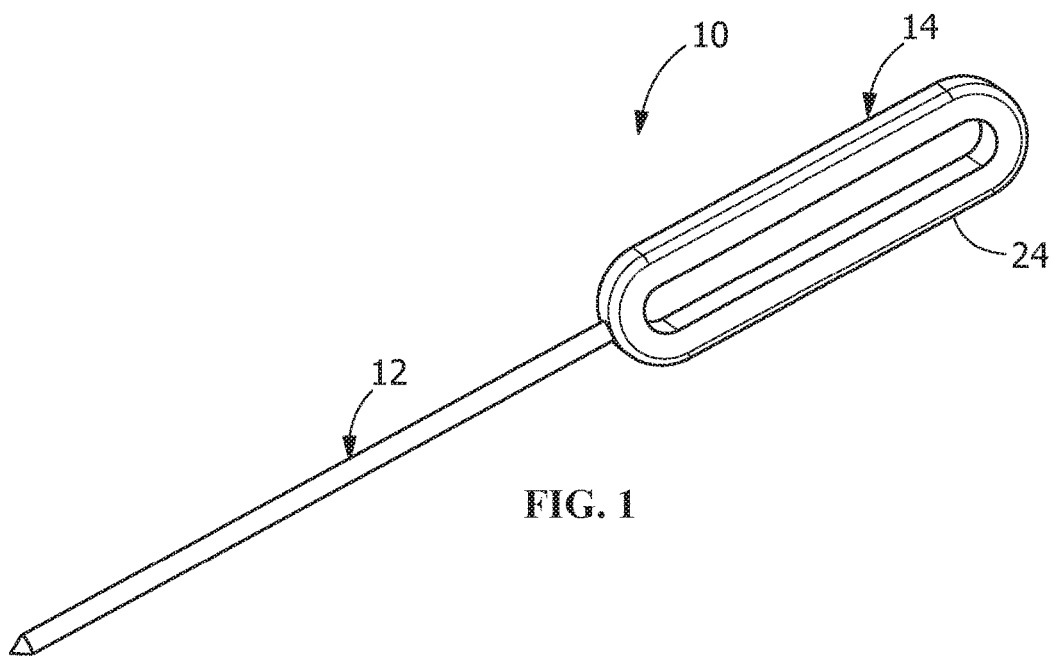
FIG. 1 is a perspective view of an illustrative sensor probe of the present invention.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

Moreover, the features and benefits of the invention are illustrated by reference to the preferred embodiments. Accordingly, the invention expressly should not be limited to such embodiments illustrating some possible non-limiting combination of features that may exist alone or in other combinations of features, the scope of the invention being defined by the claims appended hereto.

Figure 2:
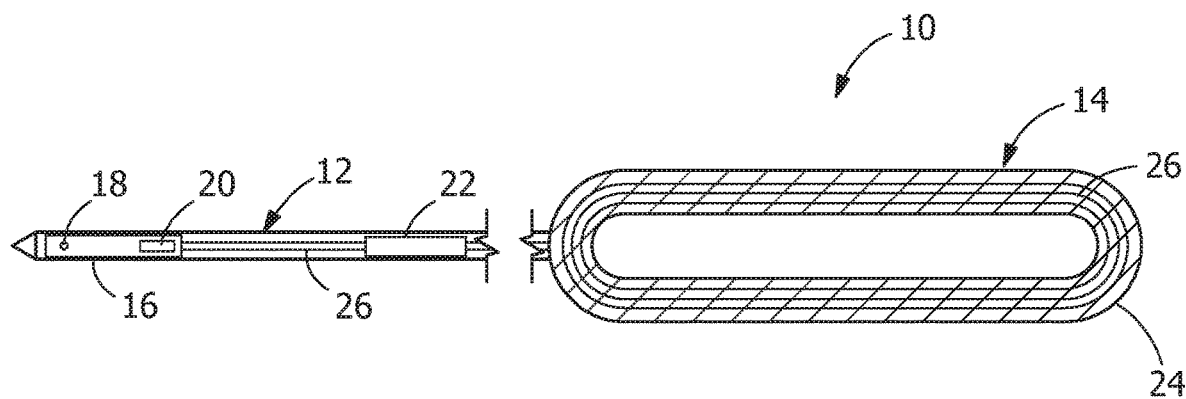
FIG. 2 is a cross-sectional view of the sensor probe of FIG. 1 taken along line 2-2.

As shown in FIGS. 1 and 2, a sensor probe 10 has a needle or probe portion 12 and a handle 14. The needle or probe portion 12 is configured to be inserted or partially inserted into a substance or material, such as, but not limited to meat. The handle 14 is configured to be positioned outside or partially of the substance or material.

The probe portion 12 houses a circuit board 16 with a processor or microcontroller. In the illustrative embodiment shown, the circuit board 16 includes a temperature sensor 18 and a near field communication (NFC)/radio frequency identification (RFID) device 20. However, in other illustrative embodiments: the temperature sensor 18 and the NFC/RFID tag or device 20 may be separate components which are electrically connected to the circuit board 16; the circuit board 16 does not have a microcontroller; any combination of the circuit board 16, the temperature sensor 20, the NFC device 20, or other sensors may be housed in one component; and/or sensors in addition to, or other than, the temperature sensor may be provided, for example, but not limited to a humidity sensor. In alternate embodiments, more than one temperature probe 18 may be provide at different locations along the length of the probe portion 12 to allow the temperature of the food to be measured at different locations.

In the illustrative embodiment shown, a terminal isolation device 22 is provided in the probe portion 12. The terminal isolation device 22 may be, but is not limited to, a capacitor or other type of thermal insulator.

Figure 6:
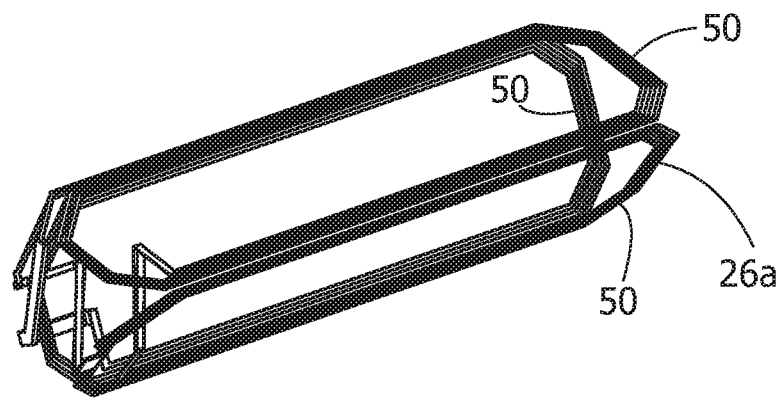
FIG. 6 is a perspective view of a first alternate antenna which can be used with the sensor probe of the present invention.
Figure 7:
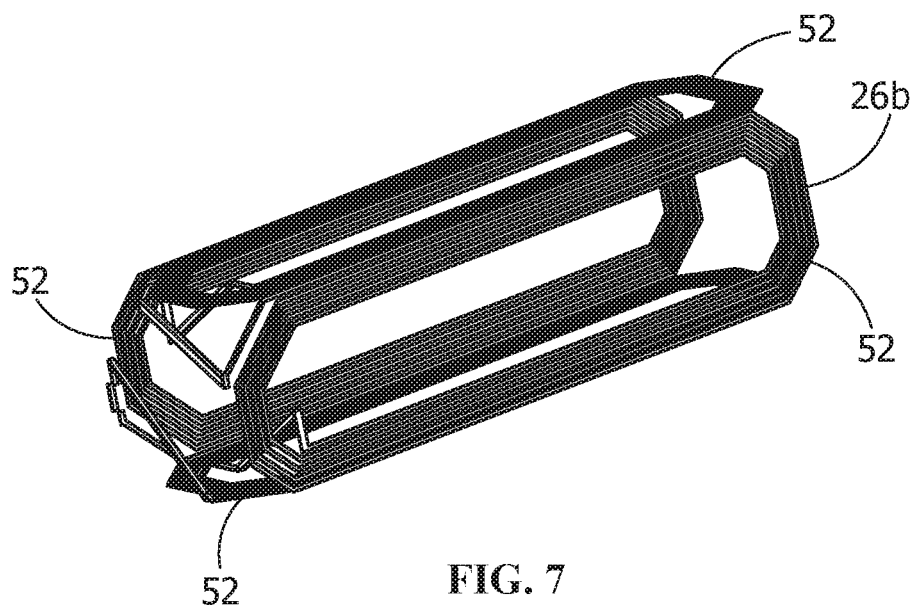
FIG. 7 is a perspective view of a second alternate antenna which can be used with the sensor probe of the present invention.

The handle 14 includes a housing 24 and a sensor probe antenna 26. The sensor probe antenna 26 may have a planar configuration as shown in FIGS. 1 and 2. Alternatively, the antenna may have other nonplanar configurations, such as, but not limited to: a curved antenna; an antenna 26a which has three planar members 50 which intersect to form a triangular cross-section as shown in FIG. 6; or an antenna 26b which has four planar members 52 which intersect to form a square cross-section as shown in FIG. 7. Other configurations of the antenna with other numbers of planar members and other configurations may also be used.

Figure 4:
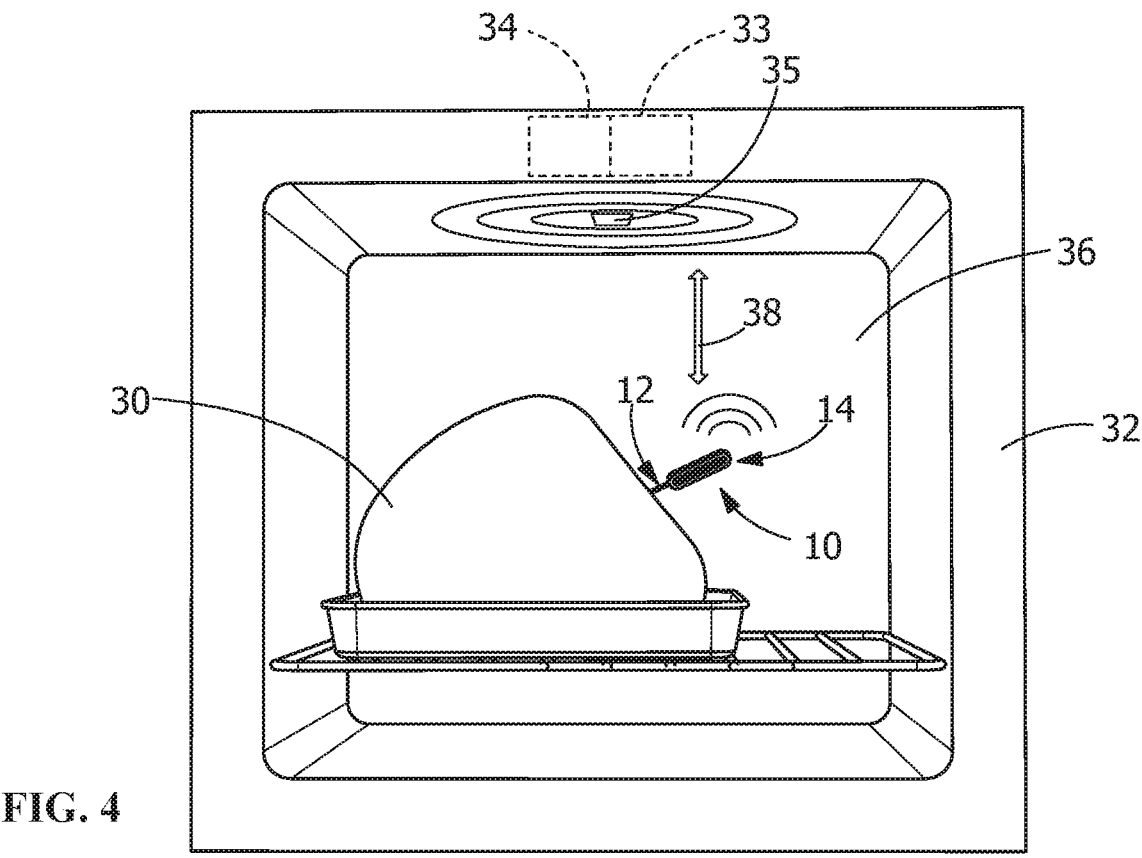
FIG. 4 is a diagrammatic view of the sensor probe positioned in a food item which is positioned in an oven.

As shown in FIG. 4, in operation, the sensor or meat probe 10 is positioned in the food or meat 30 in an oven 32. The oven has a radio frequency (RF) power transmitter 34 positioned proximate an oven cavity or compartment 36.

One of the key challenges for a sensor or meat probe 10 is the high temperature of operation inside an oven 32 or the like. Aside from using high-temperature-rated materials, the circuit board 16 and other electronics need to be protected from the high heat. Most semiconductor chips are only rated to operational temperatures of 85° C. or 125° C. As the temperature in the oven compartment 36 is often in excess of 125° C., any electronics located in a reasonably-sized handle 14 cannot be practically retained under 125° C. for 3 hours. As the best insulator inside the oven 32 is the food 30 itself, the circuit board 16 and other electronics is positioned in the needle or probe portion 12 when in use, thereby protecting or insulating the needle or probe portion 12 by the food 30.

In order to use the probe 10, the probe 10 requires energy for operation. As the probe 10 does not contain batteries, the probe 10 must use energy harvesting for operation. The battery-free meat probe 10 requires a mechanism to harvest enough energy to power the circuit board 16, temperature sensor 18 and the NFC/RFID device 20. The NFC/RFID device 20 has a unique electronic identification which is distinguishable from other similar devices.

Figure 5:
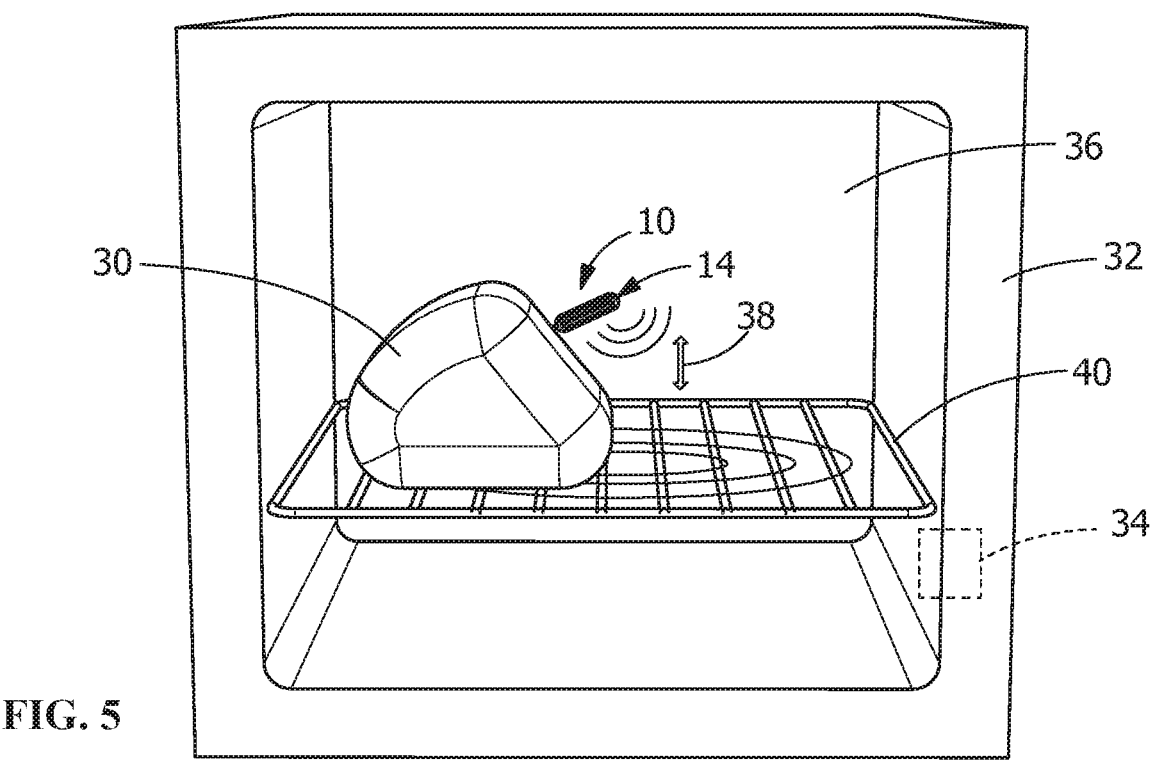
FIG. 5 is a diagrammatic view of the sensor probe positioned in a food item which is positioned in an alternate oven.

While an obvious source of energy inside an oven compartment 36 is the heat, the probe 10 must be operational even when the oven is just beginning to warm-up. In this phase, there is not enough temperature gradient to harvest the required power required for the electronics. Consequently, as shown in FIGS. 4 and 5, Radio Frequency (RF) energy harvesting is using a dedicated RF power transmitter 34 in the oven 32 is used. As the communication between the probe 10 and the power transmitter 34 is wireless, the energy in the wireless signal sent from the power transmitter 34 to the probe 10 is re-purposed, to allow the probe 10 to operate and respond. An illustrative embodiment of the RF power transmitter 34 is a RFID device which utilizes energy from the reading device (in this case the oven 32) to operate and communicate back to the probe 10 (as indicated by arrow 38). The NFC chip or device 20, shown in diagrammatically in FIG. 3, is one example of an RFID device.

The NFC system consists of a reader, which in the illustrative embodiment is the oven 32. The reader or oven 32 is a fixed system, without size restrictions, and is powered by AC current or one or more large batteries. The reader 32 consists of one or more reader electronic boards 33 connected (electrically and mechanically) to one or more reader antennas 35. The tags or devices 20 are smaller, portable, and battery-free systems which include a semiconductor NFC chip which is attached to the antenna 26. The NFC system supports communication range of up to approximately one meter using high-power readers. The NFC reader or oven 32 can detect multiple tags or devices 20 in the vicinity which is beneficial for large ovens where many pieces of food are cooked simultaneously. Alternatively, as shown in FIG. 5, the oven rack 40 may be used as the reader antenna, thereby allowing for close proximity of the sensor probe 10 to the reader antenna or rack 40 regardless of the position of the meat 30 in the oven cavity or compartment 36. The oven rack 40 may be positioned in the oven 32 with or without electrical isolation. In another alternate embodiment, the rack 40 may act as a signal enhancer to facilitate communication with a radiator or reader antenna located at another location. In other alternate embodiments, the reader electronics 33 and/or the antenna 35 may be positioned in one, two, three, four or five walls of the oven cavity or compartment 36 and/or on the door of the oven and/or at any arbitrary position inside the cavity or compartment 36. The reader electronics 33 and reader antennas 35 may be configurable to radiate in various patterns.

Figure 3:
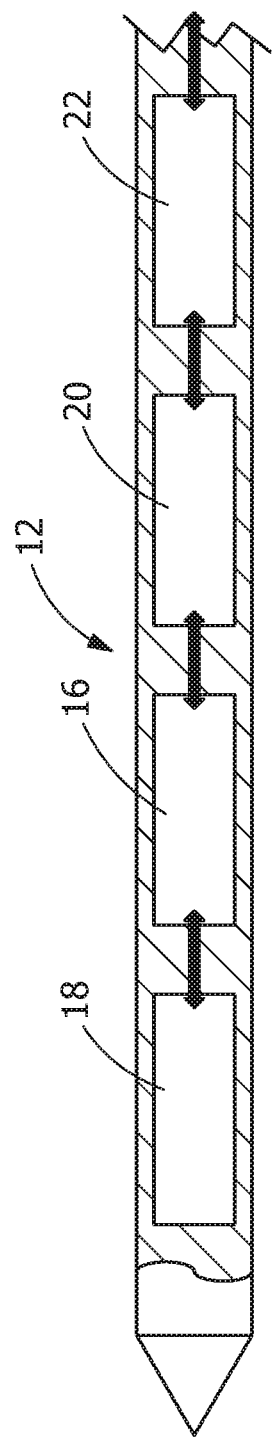
FIG. 3 is a diagrammatic view of the sensor probe of FIG. 1.

The meat probe system schematic is shown in FIGS. 2 and 3. The handle 14 of the meat probe 10 contains the antenna 26, which connects to the NFC device 20. In the illustrative embodiment, the NFC device 20 is a dynamic NFC tag chip that provides an energy-harvested output in addition to the decoded NFC data. One example of such the NFC device 20 contains a wafer-level chip-scale package (WLCSP) version of ST25DV. This NFC chip powers and communicates with, the circuit board 16 which includes, for example, an STM32 microcontroller from STMicroelectronics which uses Inter-Integrated Circuit (I2C) digital protocol, although other protocols may be used. The STM32 is an ultra-low power 32-bit microcontroller in WLCSP form-factor. As the microcontroller is powered, the microcontroller communicates with the digital temperature sensor 14 using Serial Peripheral Interface (SPI) protocol, and updates the information to the NFC device 20, which in-turn relays the data back to the oven 32. Other NFC devices 20 may be used without departing from the scope of the invention.

As it is desired to have the diameter of the probe portion 12 to be equal to or less than 4 mm, the configuration and the components of the circuit board 16 limited the level of miniaturization of the circuit board 16. While the invention is not so limited, in one illustrative example, the NFC device 20 and all active chips on the circuit board 16, such as, the microcontroller and the voltage regulator, were chosen in the smallest available form-factor—WLCSP package-type. The WLCSPs are devoid of low-temperature organic materials often used in other package types. However, other types, sizes and configurations of chips may be used.

In the illustrative embodiment shown, the circuit board 16 has a width of approximately 2.6 mm and length of approximately 20 mm. The smallest trace width and space used for routing is 100 µm, and only two metal layers were used for routing all the components on the circuit board 16. The choice of trace width and number of layers is governed by two factors: ensuring routability of all the components and minimizing manufacturing cost of the circuit board 16. However, other circuit boards 16 with other dimensions and other configurations may be used.

In the illustrative embodiment shown, the circuit board is fabricated from high-temperature circuit board material with a glass transition temperature of greater than 280° C. and thermal degradation temperature of 390° C., such as Rogers 4350. The outside housing of the probe portion 12 is made from stain-less steel or other material which conducts heat. The handle material is Polytetrafluoroethylene (PTFE). The antenna is plain enameled copper wire wound on the PTFE handle, to achieve the target inductance of 4.8 pH at 13.56 MHz. However, other inductance, other frequency and other materials can be used without departing from the scope of the invention.

All the materials that will are outside the food during operation are chosen to withstand 300° C. In contrast, the circuit board 16 and other electronics the electronics have a maximum recommended operational temperature of 85° C., as the electronics will not be subject to more than 74° C. (165° F.) during normal operation. However, the use of a high-temperature material for the circuit board 16 allows the circuit board 16 to survive accidental exposures to 300° C.

The NFC communication described above employs near-field magnetic coupling. Therefore, the antenna 26 is essentially an inductor tuned to operate at 13.56 MHz. As the stainless-steel probe portion 12 is small and blocks RF signals, the antenna 26 must be housed in the handle 14, and be capable of surviving 300° C. In one illustrative embodiment, the antenna 26 has a dimension of approximately 60 mm×16 mm. However, other sizes and configurations of the antennas may be used. The dimensions and configurations of the antenna 26 are optimized to allow the probe 10 to be positioned in the oven compartment 36 at any orientation, allowing proper communication with the oven 32 or rack 40, whichever is used as the reader antenna.

The antenna 26 is made from metal or other conductive material and is exposed to high temperatures in the oven compartment 36. In contrast, the circuit board 16 is not rated to be operated at high temperatures for long periods of time. Consequently, in order to prevent heat from being conducted through the antenna 26 to the circuit board 16, the thermal isolation device 22 is provided in line with the antenna 26 proximate the circuit board 16. The thermal isolation device 22 is provided to dissipate the heat collected and transmitted by the antenna 26, thereby preventing harmful heat from reaching the circuit board 16. The thermal isolation device 22 does not adversely affect the electrical communication between the antenna 26 and the circuit board 16.

The embodiments shown and described herein are directed to a sensor probe which is wireless and which does not need batteries, thereby allowing the needle of the sensor probe to have a small diameter. In addition, as no batteries are required, the life of the probe is not limited by battery life and safety concerns of placing batteries in an oven proximate food are eliminated. The probe is a low-cost NFC-based wireless battery-free solution for use with smart ovens.

The wireless communication of the probe with the oven allows the oven temperature to be regulated based on the actual internal food temperature readings from the probe and not the oven ambient temperature.

One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. A battery-free sensor probe for measuring the temperature of food, the sensor probe comprising:
   a probe portion having a temperature sensor, a circuit board and a near field communication radio frequency identification device;
   a handle having an antenna connected to the near field communication radio frequency identification device and the circuit board, the antenna being a nonplanar device; and
   a thermal isolation device that is provided to thermally insulate the circuit board from the antenna;
   wherein the sensor probe harvests energy from a near field communication radio frequency transmitter positioned near the sensor probe.

2. The sensor probe as recited in claim 1, wherein the antenna has three planar members which intersect to form a triangular cross-section.

3. The sensor probe as recited in claim 1, wherein the antenna has four planar members which intersect to form a square cross-section.

4. The sensor probe as recited in claim 1, wherein the temperature sensor and the near field communication radio frequency identification device are located on the circuit board.

5. The sensor probe as recited in claim 1, wherein the thermal isolation device is a capacitor.

6. The sensor probe as recited in claim 1, wherein a diameter of the probe portion is equal to or less than 4 mm.

7. A system for measuring the temperature of food in an oven, the system comprising:
   a battery-free sensor probe configured to be inserted into the food, the battery-free sensor probe having a circuit board, a near field communication radio frequency identification device and a nonplanar antenna which is spaced from the near field communication radio frequency identification device by a thermal isolation device; and
   a near field communication radio frequency transmitter positioned in the oven, the near field communication radio frequency transmitter utilizing energy from the oven to communicate and power the near field communication radio frequency identification device;
   wherein the near field communication radio frequency transmitter sends a signal to the near field communication radio frequency identification device of the battery-free sensor probe to communicate with and power the battery-free sensor probe.

8. The system as recited in claim 7, wherein the near field communication radio frequency transmitter has a reader electronics board which is positioned in the a wall of the oven and an antenna positioned inside the cavity of the oven.

9. The system as recited in claim 7, wherein the near field communication radio frequency transmitter has a reader antenna which is positioned in an oven rack positioned in the oven.

10. The system as recited in claim 7, wherein the non-planar antenna of the sensor probe is provided in a handle of the sensor probe.

11. The system as recited in claim 10, wherein the sensor probe has a probe portion having a temperature sensor, the circuit board and the near field communication radio frequency identification device, and the antenna is connected to the near field communication radio frequency identification device and the circuit board.

12. The system as recited in claim 10, wherein the antenna has three planar members which intersect to form a triangular cross-section.

13. The system as recited in claim 10, wherein the antenna has four planar members which intersect to form a square cross-section.

* * * * *